Figure 1:
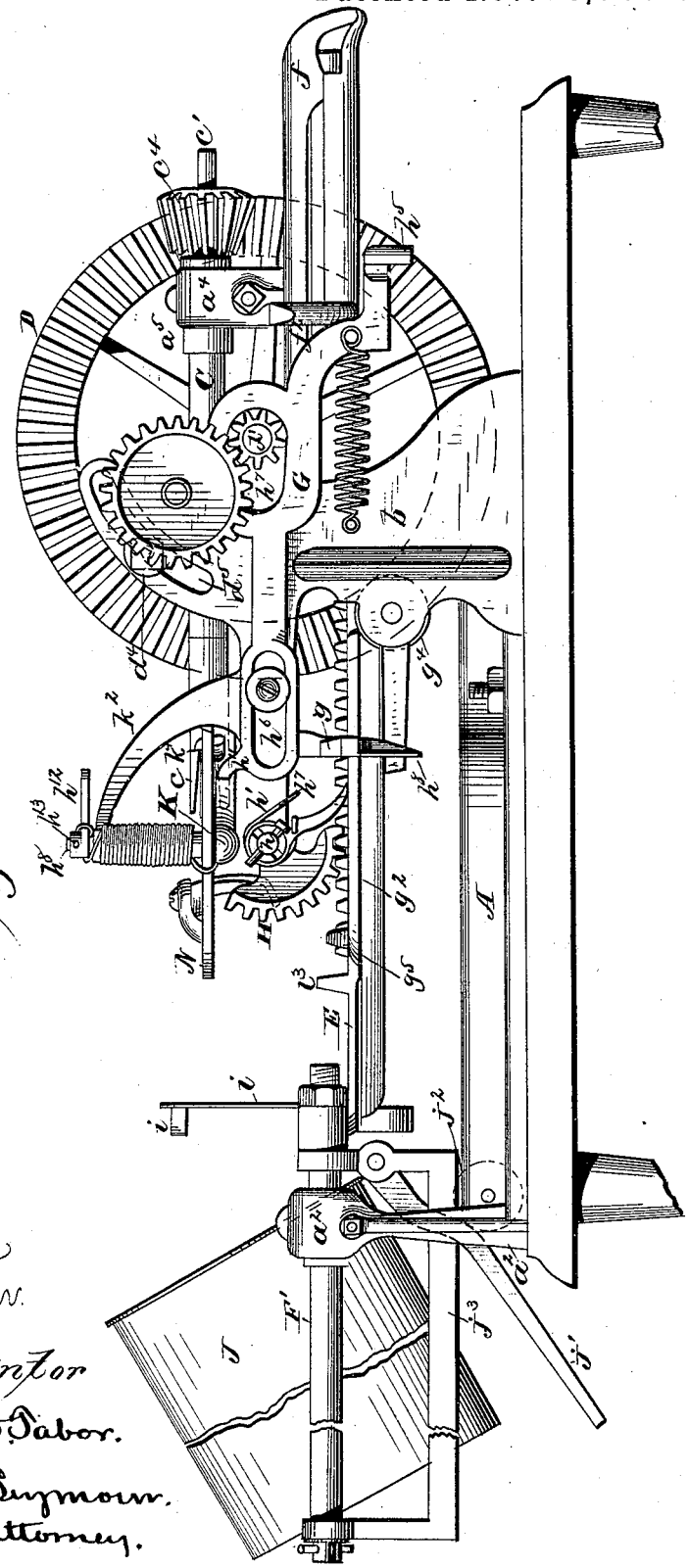

(Model.)

6 Sheets—Sheet 1.

B. D. TABOR.
APPLE PARER, CORER, AND SLICER.

No. 250,110. Patented Nov. 29, 1881.

Witnesses.
F. L. Ourand
Herman Moran.

Inventor
Byron D. Tabor.
By H. A. Seymour.
Attorney.

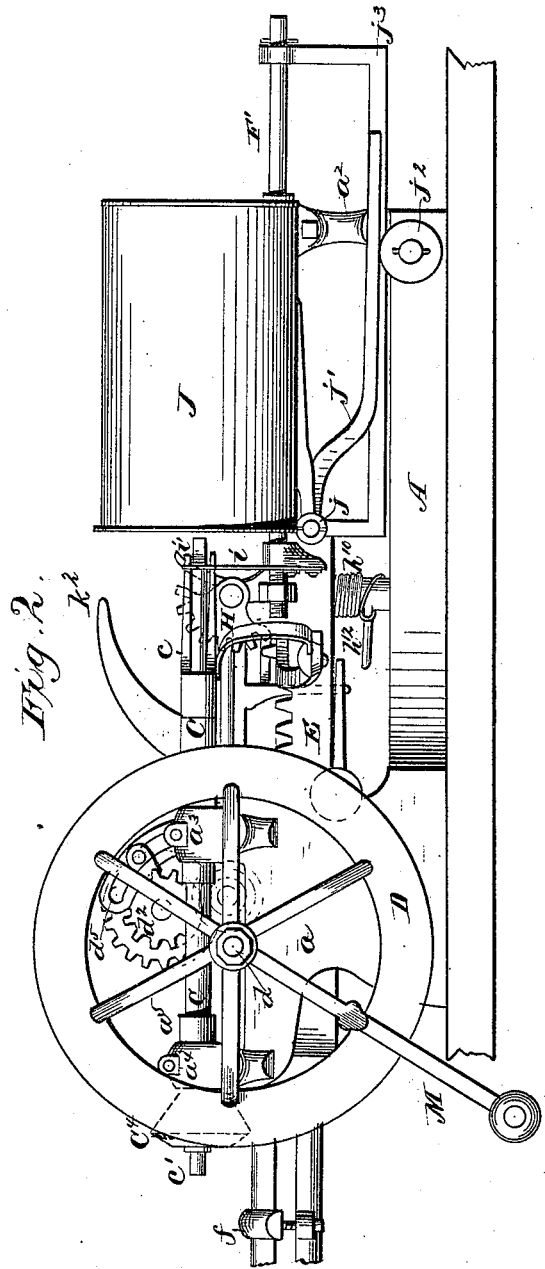

(Model.) 6 Sheets—Sheet 3.
B. D. TABOR.
APPLE PARER, CORER, AND SLICER.
No. 250,110. Patented Nov. 29, 1881.
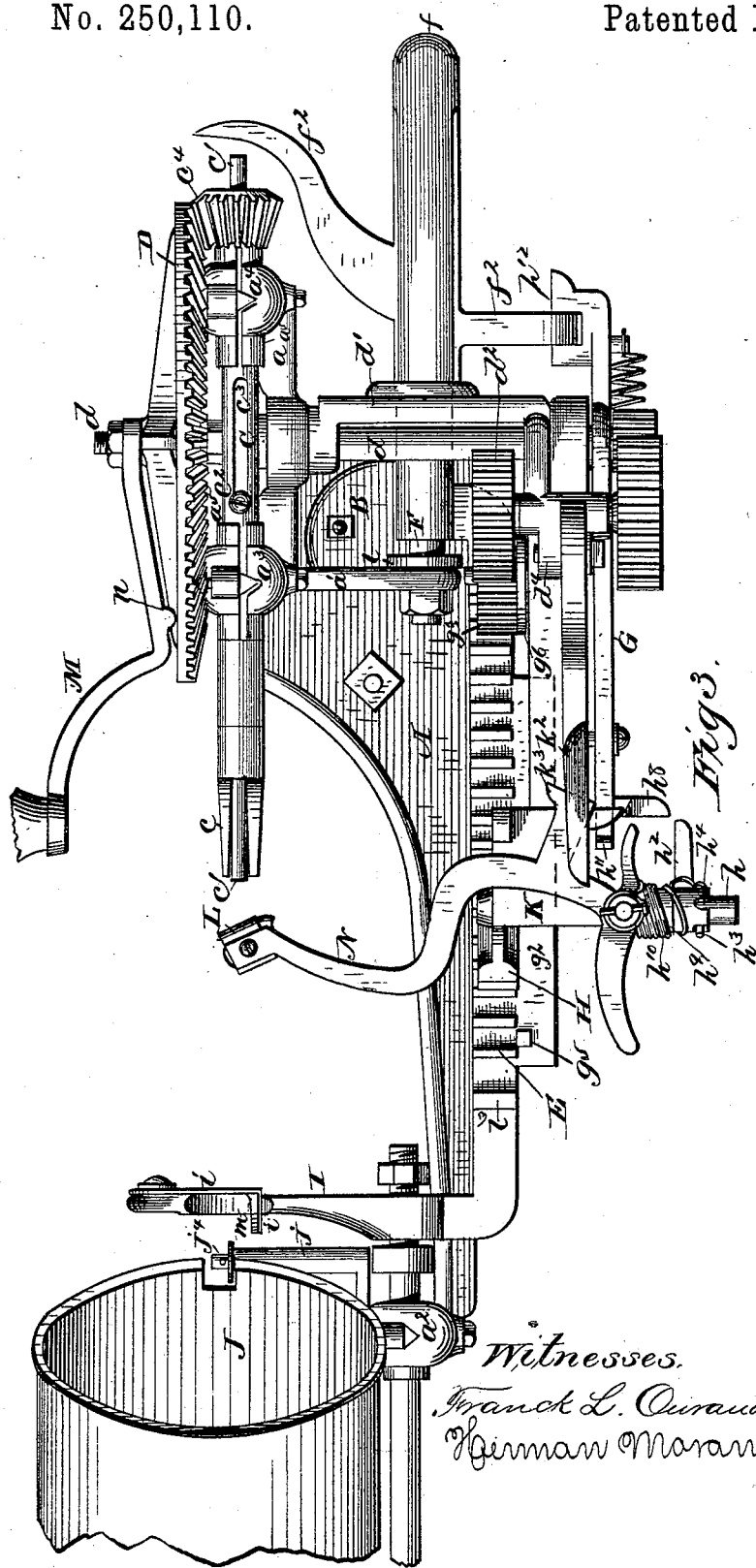

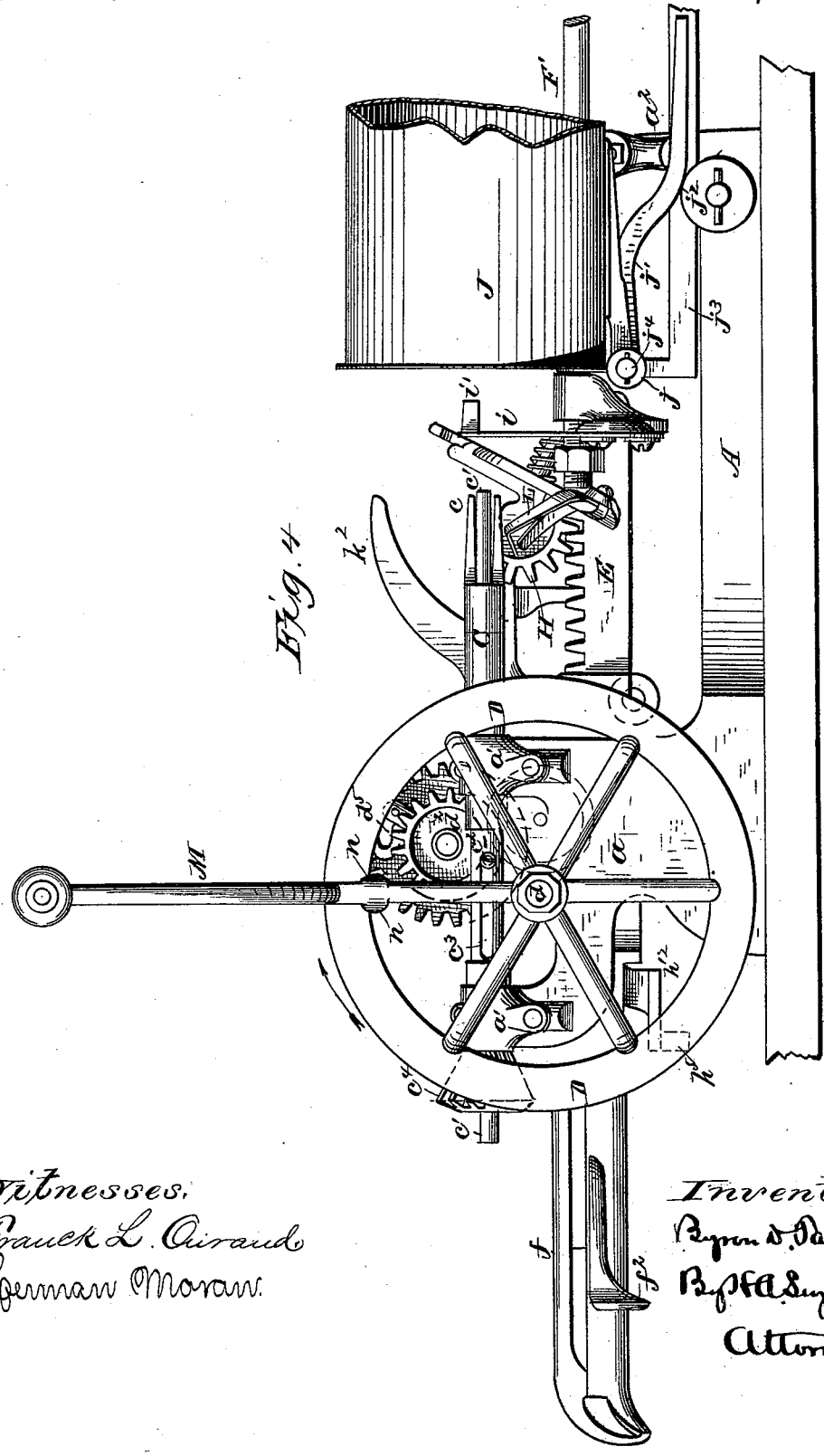

(Model.)
B. D. TABOR.
APPLE PARER, CORER, AND SLICER.
No. 250,110. Patented Nov. 29, 1881.
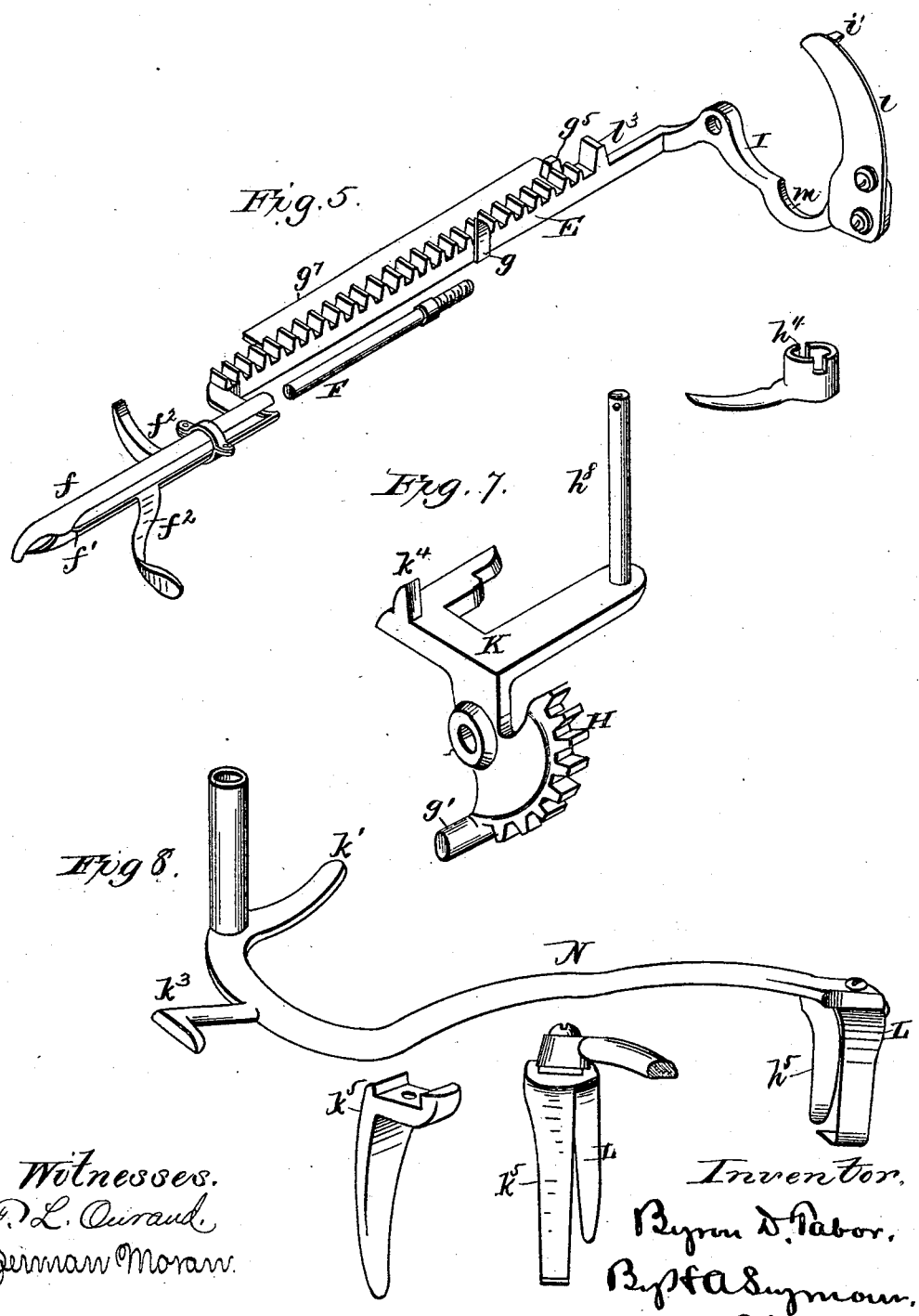

(Model.)
B. D. TABOR.
APPLE PARER, CORER, AND SLICER.
No. 250,110. Patented Nov. 29, 1881.
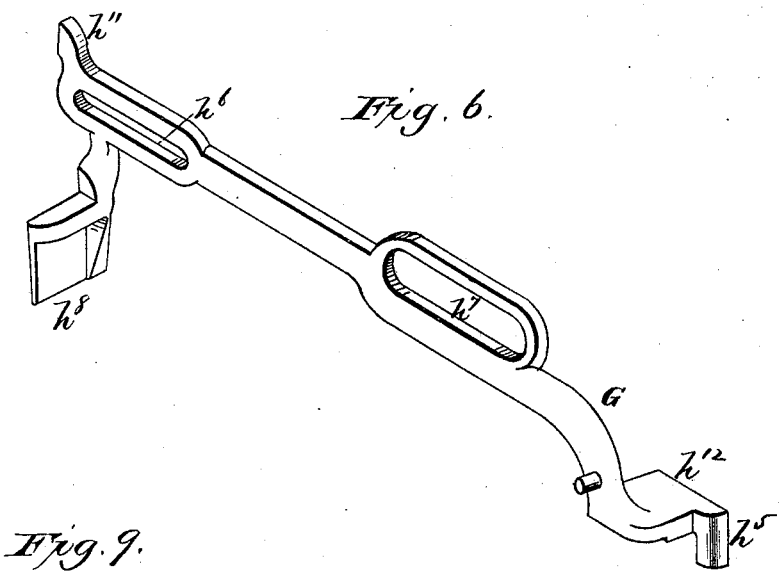
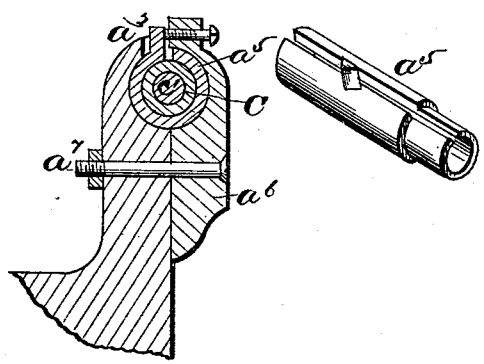
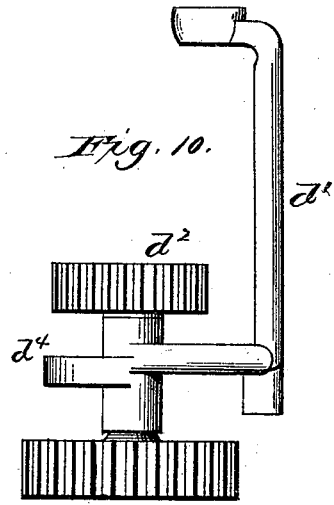
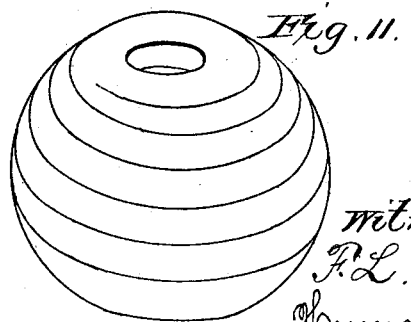
Witnesses:
F. L. Durand
Herman Moran
Inventor:
Byron D. Tabor
By H. A. Seymour
Attorney

UNITED STATES PATENT OFFICE.

BYRON D. TABOR, OF WILSON, NEW YORK.

APPLE PARER, CORER, AND SLICER.

SPECIFICATION forming part of Letters Patent No. 250,110, dated November 29, 1881.

Application filed April 15, 1881. (Model.)

*To all whom it may concern:*

Be it known that I, BYRON D. TABOR, of Wilson, in the county of Niagara and State of New York, have invented certain new and useful Improvements in Apple Corers, Parers, and Slicers; and I do hereby declare the following to be a full, clear, and exact description of the invention, such as will enable others skilled in the art to which it pertains to make and use it; reference being had to the accompanying drawings, which form part of this specification.

My invention relates to an improvement in apple parers, corers, and slicers, the object of the same being to furnish a machine that is easily operated, that automatically pares, cuts, and cores the apple at one operation without removing the apple from the machine after it has once been placed thereon, and is more especially designed for use in factories, where there are large quantities of apples to be sliced.

With these ends in view my invention consists in certain details in construction and combinations of parts, as will be more fully explained, and pointed out in the claims.

In the accompanying drawings, Figure 1 is a side view, showing the arrangement of the parts at the commencement of the operation of the paring-knife. Fig. 2 shows the arrangement after the operation is completed. Fig. 3 is a plan view. Fig. 4 is a side view, showing the manner of attaching the handle, and means for operating the receiving-tube. Fig. 5 is a detached view of the handle, rack-bar, cutting-knife, and guide-rod combined. Fig. 6 is a detached view of the operating-slide. Fig. 7 is a detached view of the segment-gear for operating the paring-knife. Fig. 8 is a detached view of the paring-knife and holder. Fig. 9 is a view of one of the adjustable bearings. Fig. 10 is a detached view of the bearing embracing the main shaft, with the gear-wheels for regulating the size of the slice secured thereto; and Fig. 11 shows the apple after it has been cored, pared, and cut.

The cast-iron bed or frame is composed of the parts A B, screwed together and held on a table or support in any desired manner. The part A of the frame supports in the upright standards $a\ a'\ a^2$ the shafts which support the combined fork and core-extractor, the slicing-knife, and its operating mechanism, and the upright standard $b$ supports the paring-knife with the operating mechanism therefor.

The standard $a$ is provided on its upper surface with two adjustable bearings, $a^3\ a^4$, having the slitted sleeves $a^5$ secured therein, in which the fork-shaft C, having the fork $c$ screwed thereon, revolves. This shaft is hollow throughout its entire length, and is provided with a core-extractor, $c'$, fitting in the interior thereof, and projecting therefrom at the front end between the tines of the fork, and at the rear end, where it receives the power to expel the core from the fork. The movement of this extractor is limited by the projection $c^2$, which passes up through a slot, $c^3$, in the shaft C. This shaft C is driven by cog-wheel $c^4$, situated at the rear end thereof, which meshes with the drive-wheel D on the main shaft $d$.

The adjustable bearings above referred to are composed of two separate parts screwed together and holding the slitted sleeves $a^5$. Each sleeve has a V-shaped projection on its upper surface to one side of the slit, which fits in a corresponding recess in the standard $a$ on the same side. A screw is passed through a projecting lip of the detachable portion $a^6$, Fig. 9, of the bearing, and bears directly against the V-shaped projection and relieves the tension on the slitted bearing without allowing the same to work loose. Wear on the bearings is taken up by tightening screw $a^7$, that holds the parts together.

The drive-shaft $d$ is boxed in a swinging frame, $d'$, Fig. 10, which has its bearings in the standards $a$ and $b$. This frame is extended upward at the side of the bearing in standard $b$, and forms the bearings for the gear-wheels which operate the slicing and paring mechanism. The gear-wheel $d^2$ on this extension of arm is screwed onto the shaft, so as to be removed and replaced by a larger or smaller one when it is desired to increase or diminish the thickness of the slices.

When the wheel is changed for the purpose above described it is necessary to move gear-wheel $d^2$ nearer to or farther from the rack-bar E, and this is accomplished by unscrewing the nut on the arm $d^4$ and moving the arm up or down in the arc-shaped slot $d^5$, as desired.

F is a guide-rod secured to the upright standard $a'$ in a horizontal direction, and forming a bearing which, in conjunction with the guide-rod F', forms the bearings on which the slicing mechanism works.

The slicing mechanism is operated by the handle $f$, Fig. 5, composed of two parts, which fit over and around the guide-rod, and secured thereon by screws, by which the wear is taken up.

The under piece, $f'$, is a continuation of the rack-bar, and is connected to the top piece by screws for tightening them on the guide-rod, and by any suitable interlocking arrangement at its rear end. The lower piece is provided with two projecting arms, $f^2$, one on each side thereof, which engage, respectively, with the core-extractor $c'$ and release the core from the fork, and with the spring-actuated slide G, which holds the parer in position while paring. This lower piece is connected at its front end to the rack-bar E, which runs parallel to the line of the handle to opposite the slicing-knife, where it is connected to the guide-rod F', situated in the same horizontal plane with the handle, said guide-rod F' passing through a bearing in the upright $a^2$, similar to those described for the fork-shaft. This rack-bar E is provided on its inner side, near its center, with a stop or projection, $g$, adapted to strike against the projection $g'$, set at right angles thereto on the segment gear-wheel H, and operates to automatically direct the teeth of the segment-gear H and cause them to mesh with the teeth in front of the stop $g$. This rack-bar is also provided on its opposite side with a lateral flange, $g^2$, which extends nearly the whole length of the rack-bar, and serves to keep the rack-teeth in engagement with the wheel $g^3$, journaled in the upright $b$, by resting on the roller $g^4$, secured to the upright $b$. When the wheels meshing with and operating this wheel $g^3$, to increase or diminish the thickness of the slices, are raised or lowered, as previously described, smaller or larger wheels have to be substituted therefor.

A lug or projection, $g^5$, Fig. 5, is formed on the lateral flange $g^2$ at its front end, and when the limit of movement of the rack-bar has been reached this lug engages with a revolving disk, $g^6$, journaled on the same axis behind wheel $g^3$, and throws the rack-bar down and out of engagement with the gear-wheel, which saves the machinery from damage, and also warns the operator of the completion of the process.

The slicing-knife holder I, Fig. 5, is made in the same piece with the rack-bar, but is extended at right angles thereto. It is curved, as shown in the drawings, and passes under the fork, and is provided with a knife or cutter, $i$, attached to its outer end by suitable screws. This knife passes up on the outside of the revolving fork with its cutting-edge facing same, and terminates in a short blade at right angles to the long one and parallel to the revolving fork. The long blade makes the spiral cut and the short one separates the core from the remaining parts. After the apple has been cut it falls into a tube adapted to receive the same, from whence it falls into a suitable receptacle. This tube J moves backward and forward, and is simultaneous in its action with the rack-bar to which it is connected. The object of this backward movement is to receive the apple when cut and direct it to its proper place, and the forward movement is to make room for the operator to place another apple in position, and also not to interfere with the working of the other parts of the apparatus. Besides this backward movement, this tube has a dipping movement, by which the apple is precipitated by gravity into the receiving-basket.

The discharge-tube J is attached to the sleeve $j$, Fig. 3, having the bent trailing-rod $j'$ attached at right angles thereto, said trailing-lever running on the roller $j^2$, attached to the bearing $a^2$.

The sleeve is journaled on the arm $j^4$, which is attached to the reciprocating frame $j^3$, said frame being suspended from the guide-rod F' and front and behind the standard $a^2$. As the rack-bar is drawn backward it draws with it the tube and trailing-lever. When the bent portion of the trailing-lever strikes the roller it, of course, turns the sleeve, which in turn elevates the rear end of the tube, which is secured therein, and when pushed forward the operation is reversed.

H is the segmental gear-wheel, having a spindle, $h$, which passes through the horizontal arm $h'$ of upright $b$. This spindle is encircled by a sleeve, $h^9$, having a spiral spring, $h^{10}$, encircling the same, the inner end of said spring being secured under the arm $h'$, and the opposite end being secured to or around the arm of the tightener $h^2$, situated on the spindle $h$ near its outer end. This tightener is provided with recesses $h^4$, which register with a hole in the spindle, through which the holding-pin $h^3$ is inserted to preserve the tension of the spring, and also allow the same to be tightened or loosened, as desired. This segment-wheel H, Fig. 7, is provided with an L-shaped bearing-plate, K, on which the parer is pivoted and moves. The long arm of this plate K has a spindle, $h^8$, on which the parer is pivoted, and also has a tightener, $h^{12}$, and pin $h^{13}$, which operate precisely like that described for the spindle of the segment-gear and tend to keep the parer against the apple without penetrating the same farther than the skin.

The holder N for the parer L is shaped as shown in Fig. 8, and is provided with a foot, $k^3$, which abuts against a curved finger, $k^2$, on the arm $h'$, and limits the approach of the parer to the fork, and also against a lug, $k^4$, on the bearing-plate K, which limits the outward movement of the parer.

The paring-knife is shaped as shown, and pointed similar to the slicing-knife, and is attached to the holder by a screw above the gage $k$, which is grooved to receive the same and prevent them from turning in the handle.

G, Fig. 6, is a spring-actuated slide, adapted to hold the paring-knife down out of the way to allow the fruit to be placed on the fork, and is situated in a parallel line with the arm $h'$. This slide is provided with two oblong slots, $h^6$ $h^7$, which fit, respectively, in bearings on the arms $h'$ and on the outer end of frame $d'$, which form the bearings on which it slides. At the rear end of this slide is a finger, $h^5$, with which the projecting arm $f^2$ on the handle engages and releases the parer and allows it to fly up in position for beginning the paring. At the upper and front end of this slide is a lug, $h^{11}$, which projects against the short arm of the bearing-plate K, and is held back thereby until released by the downward movement of the paring-knife, when it springs forward and brings the holding-plate $h^8$ in position for holding the paring-knife L down out of the way while the rack-bar and cutting-knife are shoved forward, thereby allowing room for placing another apple in position.

The operation of the device is as follows: The parts are supposed to be in the position shown in Fig. 1 at the commencement of the operation of paring, with the handle pushed forward until the front end of same rests against the rubber ring $l$, Fig. 3, on guide F. The apple is placed on the fork, which moves the core-extractor $c'$ back to its farthest limit. The handle $f$ is then grasped back of the projections $f'$ $f^2$ and drawn backward until the projection $f^2$ strikes the finger $h^5$ and draws the slide G back, which releases the curved finger $k'$ on plate K from engagement with the holding-plate $h^8$ on front end of slide G and allows the paring-knife to fly around front of the apple, which brings the segment gear-wheel in position for meshing with rack-gear E. The handle is then moved forward a short distance until it clears the lip $h^{12}$ on the rear side of slide G, and is then turned to the left, which brings the lip $g^2$ of the rack-bar E above the roller $g^4$, and causes the teeth in the rack-bar to mesh with the teeth of the segment-gear H and wheel $g^3$. The handle M of the drive-wheel D is then grasped in the right hand and turned, as indicated by the arrows, which imparts motion through the proper gearing to the fork C, rack-bar E, and paring-knife L, causing the fork to turn from left to right, the paring-knife to move in a line from the front of the apple, under the same, to the rear thereof, with its cutting-edge presented thereto throughout the whole movement, and the slicing-knife and tube to move toward the apple until the same has been cut in one continuous spiral piece, as shown in Fig. 11, the main portion of the knife making transverse cut, and the small portion or end of the same, which runs parallel to the fork, the longitudinal cut, which completely severs the core from the remaining part. Just at the close of the paring operation, and before the commencement of the slicing, the last tooth of the segment-wheel abuts against the large tooth $l^3$ of the rack-bar, which elevates the outer end of the paring-arm, and which in turn abuts against holding-plate $h^8$ on slide G, moving the spring-slide back until the finger $k'$ of the paring-arm reaches the top of holding-plate $h^8$, when slide G springs back, carrying with it the holding-plate $h^8$, which passes under finger $l^4$ and holds the segment-gear up, and makes room for the approach of the slicing-knife. At the completion of the cutting operation the revolving disk $g^6$ is met by the lug $g^5$ on the lip $g^2$, which throws the rack out of engagement with the gear-wheels, and this motion notifies the operator that the work is completed. When the parts are in this position the lip $g^2$ has passed behind the roller $g^4$, and allows the same to drop down under the gear and from engagement therewith onto the inclined side of upright $a'$, on which it is moved. The handle $f$ should then be turned by the operator until the projecting arm $f^2$ on the same is in the same horizontal plane with the core-extractor. During this last operation the slicing-knife holder is elevated so that the fork is encircled at the rear of the apple by the semicircular portion $m$ of the handle, this portion $m$ being of sufficient diameter to allow of the passage of the core without interference. The handle is now moved forward, which causes the semicircular portion $m$ of the knife-holder to strike the end of the apple, which causes it to slide off into the tube J, in which it is carried and dropped by the dipping movement, and also causes the projecting arm $f^2$ to advance to the core-extractor, which it strikes, and forces the core from the fork, from which it falls into the waste-receiver, and the operation is completed.

The springs on the paring mechanism hold the paring-knife to its work without allowing it to penetrate too deep, and also assist in holding the same out of the way after its work has been completed.

The handle for operating the drive-wheel is provided with an opening, through which the drive-shaft passes, and is secured thereon by a nut, and has two lugs, $n$, projecting from its sides, which overlap the edge of a spoke of the drive-wheel, which, when the nut is screwed on, prevents the handle from slipping and holds it securely in place.

It is evident that numerous changes in the construction and arrangement of the different parts of the machine can be resorted to without departing from the spirit of my invention, and hence I do not limit myself to the exact construction and arrangement of the different parts, but consider myself at liberty to make such alterations and changes as come within the scope of my invention.

Having fully described my invention, what I claim as new, and desire to secure by Letters Patent, is—

1. The combination, with the hollow fork-shaft, of a reciprocating core-extractor located in said shaft, and an arm or finger on a reciprocating handle adapted to be engaged with and disengaged from the reciprocating core-extractor, substantially as set forth.

2. The combination, with the hollow fork-shaft, a bevel-gear secured thereto, and a drive-wheel arranged to mesh with said bevel-gear, of a reciprocating core-extractor located in the hollow shaft, and a reciprocating handle provided with an arm adapted to engage with said core-extractor, substantially as set forth.

3. The combination, with the hollow fork-shaft, of the supporting-frame of an apple-parer provided with half-bearings, adjustable half-bearings secured thereto, slitted bearing-sleeves located between the half-bearings, and set-screws for contracting the slitted bearing-sleeves to take up for any wear, substantially as set forth.

4. The combination, with a fork-shaft, paring-knife, and devices for actuating the same, of an oscillating and reciprocating rack-bar having a combined slicing and coring knife secured thereto, substantially as set forth.

5. The combination, with a revolving hollow fork-shaft, and a reciprocating core-extractor located therein, of a reciprocating and oscillating rack-bar having a combined slicing and coring knife secured thereto, substantially as set forth.

6. The combination, with a revolving hollow fork-shaft, and a reciprocating core-extractor located therein, of a reciprocating and oscillating rack-bar having a combined slicing and coring knife secured thereto, and a discharge-tube adapted to be reciprocated in unison with the slicing and coring knife, substantially as set forth.

7. The combination, with a revolving hollow fork-shaft, and a reciprocating core-extractor located therein, of a reciprocating and oscillating rack-bar having a combined slicing and coring knife secured thereto, and a yielding paring-knife actuated by a segmental gear which meshes with the rack-bar, substantially as set forth.

8. The combination, with a reciprocating rock-shaft having a frame secured thereto, of a discharge-tube secured to an arm journaled on a spindle connected with said frame and a trailing-lever, substantially as set forth.

9. The combination, with a hollow fork-shaft, and a reciprocating core-extractor located therein, of an oscillating and reciprocating rack-bar having a combined slicing and coring knife secured thereto, and provided with a hollow handle which fits a guide-rod attached to the supporting-frame, substantially as set forth.

10. The combination, with a revolving fork, a reciprocating and oscillating rack-bar having a combined slicing and coring knife secured thereto, of a yielding paring-knife and devices, substantially as described, for imparting a part revolution thereto and retaining it out of contact with the apple while the latter is operated upon by the slicing and coring knife, substantially as set forth.

11. The combination, with an oscillating and reciprocating rack-bar for actuating the cutting and paring knife, said rack-bar provided with a lateral flange, of a supporting-roller for retaining the rack-bar and mesh with the gear, through which motion is imparted thereto, substantially as set forth.

12. The combination, with the reciprocating and oscillating rack-bar provided with a lip or projection, of a disk for throwing the gear out of mesh with the rack-bar, substantially as set forth.

13. The combination, with the yielding paring-knife and mechanism for imparting a part revolution thereto, of a slide provided with a holding-plate, substantially as set forth.

14. The combination, with the shaft supporting the segmental gear and a bearing-sleeve, of a spring encircling said sleeve, and a tightener having one end of the spring secured thereto, said tightener adapted to be adjustably secured in place, substantially as set forth.

15. The combination, with the segmental gear-shaft having a transverse hole formed therein, of a bearing-sleeve, a spiral spring encircling said sleeve, and a spring-adjusting device consisting of a sleeve provided with a handle and furnished with a series of notches in one edge thereof, substantially as set forth.

16. The combination, with the segmental gear provided with a spindle, of the paring-knife arm constructed with a sleeve which fits upon said spindle, a spring tension-adjusting device located on the end of said spindle, and a spiral spring encircling the sleeve, one end of the spring being secured to the spring tension-adjusting device, substantially as set forth.

17. The combination, with a slide for retaining the paring-knife out of operative position, of an arm or finger attached to the reciprocating handle and adapted to engage said slide and retract the same, substantially as set forth.

18. The combination, with the reciprocating rack-bar and main driving-shaft, of a gear supported in an oscillating frame having the driving-shaft its center of motion, and a gear interposed between the rack-shaft and said adjustable gear, substantially as set forth.

In testimony that I claim the foregoing I have hereunto set my hand and seal this 22d day of March, 1881.

BYRON D. TABOR. [L. S.]

Witnesses:
 H. SANFORD,
 C. N. ARNOLD.